(12) United States Patent
Muscarnera et al.

(10) Patent No.: US 12,188,720 B2
(45) Date of Patent: Jan. 7, 2025

(54) APPARATUS AND METHODS FOR THE DRYING TREATMENT OF AN INDUCTOR

(71) Applicant: DANIELI AUTOMATION S.P.A., Buttrio (IT)

(72) Inventors: Giuseppe Muscarnera, Siano (IT); Enzo Gigante, Porpetto (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 740 days.

(21) Appl. No.: 17/433,235

(22) PCT Filed: Feb. 21, 2020

(86) PCT No.: PCT/IT2020/050036
§ 371 (c)(1),
(2) Date: Aug. 23, 2021

(87) PCT Pub. No.: WO2020/170285
PCT Pub. Date: Aug. 27, 2020

(65) Prior Publication Data
US 2022/0146198 A1 May 12, 2022

(30) Foreign Application Priority Data
Feb. 21, 2019 (IT) .................. 102019000002549

(51) Int. Cl.
| | |
|---|---|
| *H05B 6/06* | (2006.01) |
| *C21D 1/42* | (2006.01) |
| *C21D 11/00* | (2006.01) |
| *F26B 3/347* | (2006.01) |
| *F26B 13/10* | (2006.01) |
| *F26B 23/04* | (2006.01) |

(52) U.S. Cl.
CPC ............ *F26B 3/347* (2013.01); *C21D 1/42* (2013.01); *C21D 11/005* (2013.01); *F26B 23/04* (2013.01)

(58) Field of Classification Search
CPC ........... F26B 3/30; H05B 3/44; H05B 1/0291; H05B 2203/012
USPC ............................ 392/424, 425; 34/266, 269
See application file for complete search history.

(56) References Cited

U.S. PATENT DOCUMENTS

| | | | | |
|---|---|---|---|---|
| 2,325,638 A | * | 7/1943 | Strickland, Jr. ........... | H05B 6/02 219/637 |
| 2,622,304 A | * | 12/1952 | Coffer .................... | C04B 35/64 219/383 |
| 2,676,234 A | * | 4/1954 | Lackner ................... | H05B 6/06 219/662 |

(Continued)

FOREIGN PATENT DOCUMENTS

GB 742 856 A 1/1956

OTHER PUBLICATIONS

International Search Report and Written Opinion issued in PCT/IT2020/050036, mailed Apr. 29, 2020.
(Continued)

*Primary Examiner* — Dana Ross
*Assistant Examiner* — Lawrence H Samuels
(74) *Attorney, Agent, or Firm* — MARSHALL, GERSTEIN & BORUN LLP

(57) ABSTRACT

An apparatus for the off-line drying treatment, or dry out, of an inductor for billets that includes a coil and a protection body made of refractory material that defines a transit channel for the billets.

9 Claims, 3 Drawing Sheets

(56) References Cited

U.S. PATENT DOCUMENTS

| | | | | | |
|---|---|---|---|---|---|
| 2,852,650 | A | * | 9/1958 | De Coriolis | H05B 6/02 266/259 |
| 2008/0098611 | A1 | * | 5/2008 | Dancel | A01B 45/00 34/465 |
| 2008/0302776 | A1 | * | 12/2008 | Arima | F23Q 7/001 219/270 |
| 2012/0145695 | A1 | * | 6/2012 | Radmacher | B28B 1/008 156/89.12 |

OTHER PUBLICATIONS

International Preliminary Report on Patentability issued in PCT/IT2020/050036, mailed May 26, 2021.

\* cited by examiner

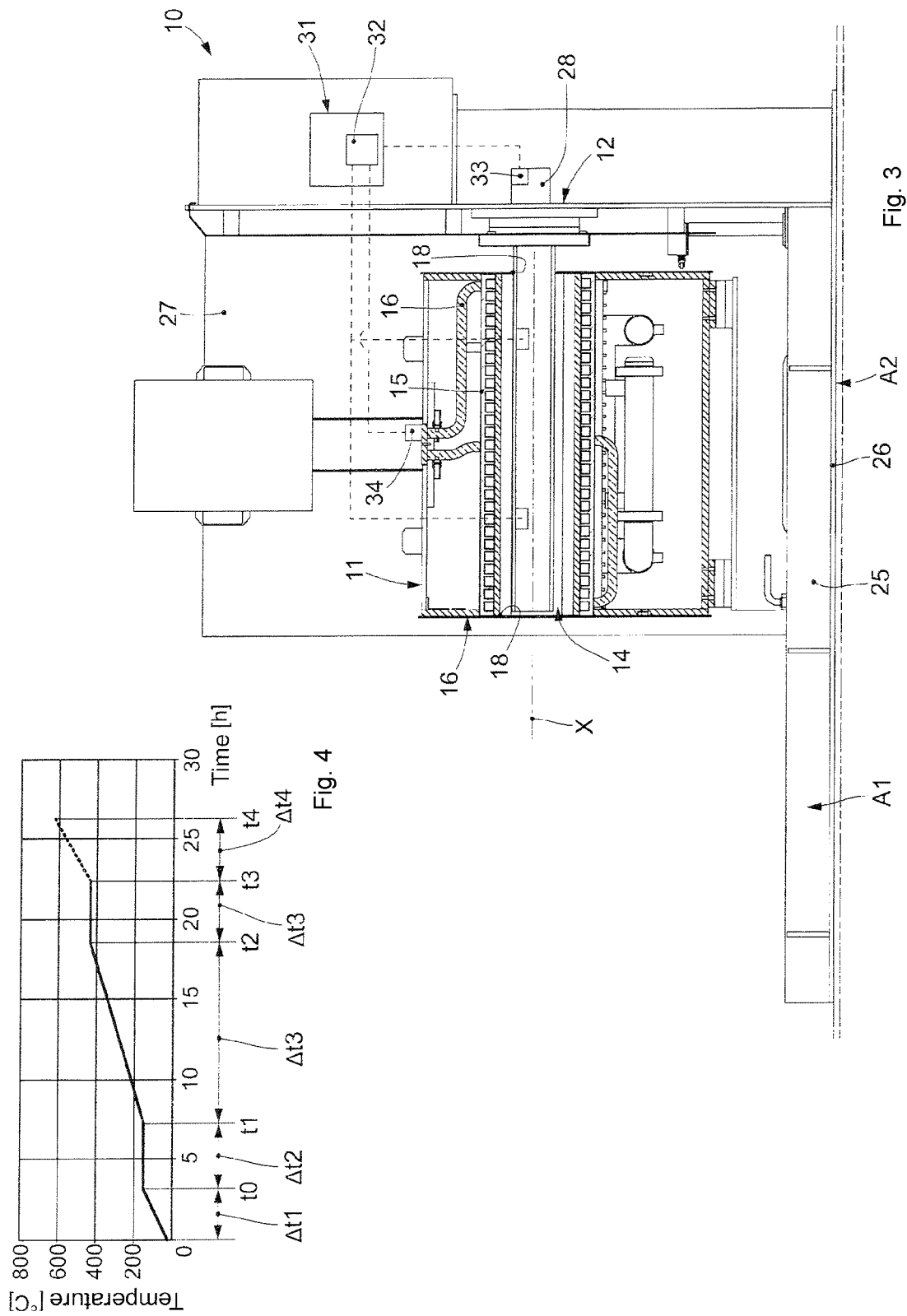

APPARATUS AND METHODS FOR THE DRYING TREATMENT OF AN INDUCTOR

FIELD OF THE INVENTION

The present invention concerns improvements in the management of inductors for billets normally used along rolling lines.

The invention concerns both a new apparatus and also a new method for the drying treatment of an inductor.

BACKGROUND OF THE INVENTION

It is known that in rolling plants inductors, also called induction furnaces, are used, disposed along the rolling lines in such a way as to increase the temperature of the billets passing through them.

These inductors generally comprise a coil of spirals into which an electric current is fed and a layer of binding material, generally refractory cement, which thermally and mechanically protects the spirals, and defines the transit channel for the billets.

It is also known that due to the thermal stresses to which the inductors have to be subjected when they are functioning, during their installation and start-up phase it is necessary to use measures aimed at preserving them.

In particular, it is necessary for the binding material in which the spirals are embedded to be dried on the basis of precise curves that condition the ratio between time and temperature.

Before being fully operational, an inductor may require even more than 20 hours of drying, generally between 20 and 30 hours, in which the temperature is progressively increased with a very slow temperature gradient up to a maximum temperature of about 600° C.

The state of the art provides to perform the drying treatment, also known as dry-out in the sector, by installing the inductor along the rolling line and making a hot billet pendulate inside it until the temperature of the inductor reaches steady state.

The drying period therefore requires a long period during which the rolling line cannot be used, since the progressive increase in temperature has to occur progressively without sudden temperature changes that would affect the integrity of the inductor, in particular of the binding material.

Furthermore, the drying treatment method of the state of the art does not allow to adequately control the temperature of the refractory material. This temperature, in fact, is not controlled directly, but indirectly on the basis of the temperature of the billet, which is detected by means of a thermal imaging camera, which, however, does not coincide with the temperature of the refractory material.

Furthermore, in the rolling line, in an induction heating process, it is not possible to stabilize the temperature of the billet to the desired value.

Furthermore, since it is not operationally possible to keep a billet oscillating for 24-28 hours, that is, the amount of time required to complete the drying treatment, four or more displacements forward and backward are necessary, with a high risk of blocking and melting the billet in the inductor, which could damage the refractory material.

In addition to these risks, this also entails considerable costs for the drying treatment of the inductors.

Furthermore, with the method provided by the state of the art, there is never the certainty of being able to completely and homogeneously dry all the refractory material, in particular the internal layer close to the coil, with the risks that this entails.

Documents U.S. Pat. Nos. 2,852,650, 2,325,638, 2,676,234, GB-A-742 856 describe inductor devices known in the state of art, on which, prior to installation, it is necessary to perform drying treatments.

There is therefore the need to perfect a method and an apparatus for the drying treatment of an inductor which can overcome at least one of the disadvantages of the state of the art.

One purpose of the present invention is to provide an apparatus for the drying treatment of an inductor which allows to reduce machine downtimes of the rolling line required by the state of the art.

Another purpose of the present invention is to provide an apparatus for the drying treatment which allows effective control of the temperature of the refractory material.

Another purpose of the present invention is to provide an apparatus and a method for the drying treatment of an inductor that is simple and economical.

Another purpose of the present invention is to provide an apparatus and a method for the drying treatment which allow to reduce overall energy consumption and therefore costs.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

Embodiments described here concern an apparatus for the drying treatment, or dry-out, of an inductor, or induction furnace for billets, of the type normally used to heat billets in transit along a rolling line. The inductor comprises a coil and a body made of refractory material placed to protect the coil, which defines a transit channel for the billets.

The apparatus according to the invention advantageously allows to carry out the drying treatment outside of the rolling line, so as to reduce interruptions of it to a minimum.

According to the invention, the apparatus comprises a heating device having an oblong development along a longitudinal axis and configured to be located, during use, inside the transit channel of the inductor. The apparatus also comprises supply devices to supply electrical energy to the heating device and a control and command unit configured to command the supply devices and regulate the functioning of the heating device according to a predefined program in order to carry out a desired drying treatment cycle of the body of refractory material of the inductor.

According to some embodiments, the functioning of the heating device, and in particular the activation period and the temperature thereof, are regulated in such a way as to remove all possible residual humidity of the refractory material, or at least until it has fallen below a minimum percentage, for example less than 2% or 1%.

According to some embodiments, the apparatus comprises a support structure suitable to position the heating device with its axis of development oriented in a substantially horizontal direction.

According to some embodiments, the heating device comprises at least one electric resistance having a conformation similar to a billet and configured to transform the electrical energy received into radiant heat. The use of an electric resistance allows to regulate its temperature in a desired manner, acting directly on the supply devices, since the temperature is correlated to the supply voltage According to other embodiments, the apparatus comprises temperature detection sensors configured to detect the temperature of the heating device.

According to some embodiments, the temperature detection sensors comprise at least one thermocouple associated with the at least one resistance.

The use of detection sensors associated with the heating device, or in direct contact with it, allows to obtain a direct and precise detection of the temperature of the heating device.

According to other embodiments, the control and command unit is configured to modulate the supply voltage and/or power of the resistance on the basis of a feedback control in a closed ring of the detected temperature of the resistance and/or of a temperature of the refractory material estimated on the basis of a thermal mathematical model of the inductor.

The modeling of the inductor allows to simplify the control of the drying treatment, avoiding the use of temperature probes to be positioned inside the channel of the inductor and, moreover, it allows to also control the innermost layers of the refractory material located in contact with the coil, so as to also guarantee a total drying thereof.

According to some embodiments, the apparatus comprises a support slider suitable to move the inductor with respect to the heating device.

According to a first formulation, the heating device has a position that is defined in relation to one type of inductor.

According to another formulation, the heating device is adjustable in order to make it suitable to operate on different types of inductors.

According to another formulation, the heating device, the possible slider and the supply, control and command system make up a separate unit.

Once the inductor has been stabilized, it can be placed in the rolling line, or possibly placed in storage.

In the event that the inductor is placed in storage, the invention provides that, in order to prevent the hygroscopicity of the refractory material from absorbing humidity, a temperature maintenance device is applied to the inductor which maintains the whole inductor at a temperature around 60-90° C., advantageously 70-90° C.

According to some embodiments, the apparatus itself defines the temperature maintenance device.

According to other embodiments, the temperature maintenance device is made as a separate unit, possibly commanded by the control and command unit.

Embodiments described here also concern a method for the drying treatment, or dry-out, of an inductor that provides to carry out the treatment cycle outside of a rolling line.

The method provides to:
position the inductor with the transit channel around a heating device having an oblong development along an axis of longitudinal development;
supply electrical energy to the heating device by means of supply devices;
command the supply devices and regulate the functioning of the heating device according to a predefined program by means of a control and command unit in order to suitably heat the heating device and perform a desired cycle of drying treatment of the inductor comprising successive steps of heating and stabilizing the temperature of the refractory material.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 3 is a partly sectioned lateral view of the apparatus of FIG. 1 in an operating condition;

FIG. 4 is a graph of the drying cycle of an inductor 11,

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
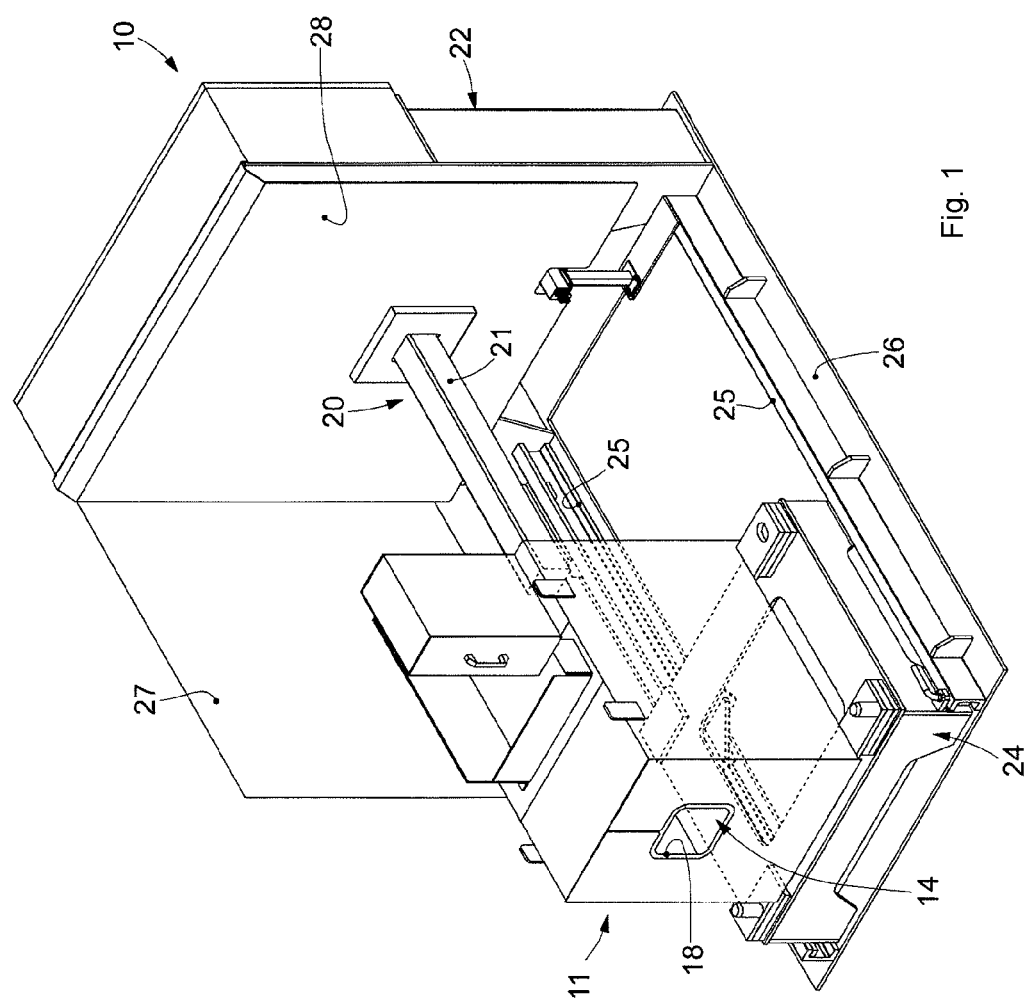
FIG. 1 is a schematic perspective view of an apparatus for the installation of an inductor according to embodiments described here, with the inductor indicated with dotted lines.

We will now refer in detail to the various embodiments of the present invention, of which one or more examples are shown in the attached drawing/s. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here concern an apparatus 10 configured to carry out a drying treatment, or dry out, of an inductor 11, or induction furnace.

The apparatus 10 according to the invention advantageously allows to carry out the drying treatment of the inductor 11 outside a rolling line, reducing its downtimes to a minimum.

The inductor 11 comprises, in a known manner, a coil 12 which is powered by alternating current at an appropriate frequency, and a body made of refractory binding material 13, generally refractory cement, which protects the coil 12 and delimits a transit channel 14 in the which, during use, the billets to be heated transit.

The coil 12 can consist of a tube wound in spirals in which a cooling fluid, usually water, is circulated in order to preserve its mechanical resistance properties.

The alternating electric current that circulates in the coil 12 generates an alternating induced magnetic field in the transit channel 14, and generates induced currents in any conductive metal material whatsoever that is hit by the induced magnetic field, that is, the billets. The currents induced in the conductive metal material generate, in turn, thermal energy by Joule effect.

The inductor 11 generally comprises power supply circuits 15 configured to supply electrical energy to the coil 12, and cooling circuits 16 configured to supply the cooling fluid.

The inductor 11 also comprises a containing body 17 configured to enclose the different components inside it, which is provided with through holes 18 which allow access to the transit channel 14.

According to some embodiments, the apparatus 10 comprises a heating device 20 configured to heat the inductor 11 according to a predefined heating program.

According to some embodiments, the heating device 20 comprises an electric resistance 21 which acts as a false billet, and has sizes and characteristics suitable and correlated to the sizes and characteristics of a real billet intended to be made to pass, during use, in the transit channel 14 of the inductor 11.

The heating device 20 also comprises a power supply device 28 suitable to supply electrical energy to the resistance 21.

According to possible variants, not shown, two or more heating devices 20 can be provided, or two or more electric resistances 21, each connected to power supply devices 28.

According to some embodiments, the resistance 21 has an oblong development along an axis of longitudinal development X and has a cross section of a size suitable to be introduced into the transit channel 14.

According to some embodiments, the resistance 21 has a length L along the axis of longitudinal development X correlated to the length of the transit channel 14 of an inductor 11.

According to some embodiments, the resistance 21 is of the ceramic type.

According to some embodiments, the apparatus 10 comprises temperature detection sensors 29 configured to detect the temperature of the resistance 21.

According to some embodiments, the temperature detection sensors 29 comprise a thermocouple 30, which can be positioned inside the ceramic structure of the resistance 21.

In this way, it is possible to directly detect the temperature of the resistance 21 at any time, obtaining a precise and reliable value.

According to some embodiments, a plurality of thermocouples 30 can be provided disposed along the longitudinal extension of the resistance 21.

According to some embodiments, the apparatus 10 comprises a support structure 22 configured to support the electric resistance 21 in such a way that its axis of longitudinal development X is oriented in a substantially horizontal direction.

By "substantially horizontal" we mean a horizontal direction or at most inclined by an angle of less than 5°, or also less than 10°.

According to some embodiments, the support structure 22 comprises a wall 23 which extends on a substantially vertical plane, on which the electric resistance 21 is installed cantilevered, which will therefore be disposed in a direction substantially orthogonal with respect to the wall 23.

According to possible variants, if two or more heating devices 20 or two or more resistances 21 are present, these can be disposed parallel to each other on a same side of the wall 23, or disposed cantilevered on opposite sides of the latter.

According to some embodiments, the two or more heating devices 20 or the two or more electric resistances 21 can be configured to cooperate all with a single inductor 11, or each one with a respective inductor 11.

According to some embodiments, the apparatus 10 comprises a control and command unit 31 configured to command the activation of the heating device 20 according to a desired heating program, correlated to the drying treatment of the inductor 11 that has to be carried out.

The control and command unit 31 is configured to activate the power supply devices 28 so as to modulate the power supplied to the resistance 21 as a function of the quantity of radiant heat that it has to supply in order to heat the refractory material 13 by radiation, so that it reaches the desired temperature.

By way of example, FIG. 4 shows a drying cycle of an inductor 11 in which the temperature is increased in successive steps in an overall time interval that has a duration of about 27 hours. The figure shows, by way of example, six time instances t0, t1, t2, t3, t4, t5 which define five time intervals $\Delta t1$-$\Delta t5$.

The drying cycle can follow an alternating development between heating steps, in which the temperature is progressively increased, and stabilization steps, in which the temperature is kept substantially constant.

According to some embodiments, the apparatus 10 comprises a support slider 24 configured to support an inductor 11 on it and move it toward/away from the support structure 22 and the heating device 20, so as to position it around the resistance 21.

The support slider 24 can comprise movement members, not shown, for example wheels, bearings, or suchlike, suitable to allow at least its movement on a horizontal plane in a direction parallel to the axis of longitudinal development X.

According to other variants, the support slider 24 can also comprise movement members configured to move the inductor 11 in a vertical direction.

According to some embodiments, the apparatus 10 can comprise guide members 25 configured to cooperate with the support slider 24 so as to constrain the movement of the latter and facilitate the positioning of the inductor 11 supported by the latter with respect to the resistance 21.

According to some embodiments, the guide members 25 comprise a pair of guides which extend parallel to each other along opposite sides of the axis of longitudinal development X, suitable to cooperate with the movement members of the slider 24.

In this way, it is possible to position the inductor 11 simply and precisely so that the axis of longitudinal development X of the resistance 21 is substantially coaxial to a central axis of the transit channel 14.

According to some embodiments, a support base 26 can be provided, connected to the support structure 22, on which the guide members 25 are provided.

According to some embodiments, the resistance 21, the support slider 24 and the control and command unit 31 constitute a separate unit.

According to some embodiments, the support base 26 and the guide members 25 can have a substantially double extension with respect to the longitudinal extension of the inductor 11.

In this way, there can be defined on the support base 26 a first non-operating zone A1, configured for the positioning and removal of the inductor 11, and a second operating zone A2 for carrying out the drying treatment.

Figure 2:
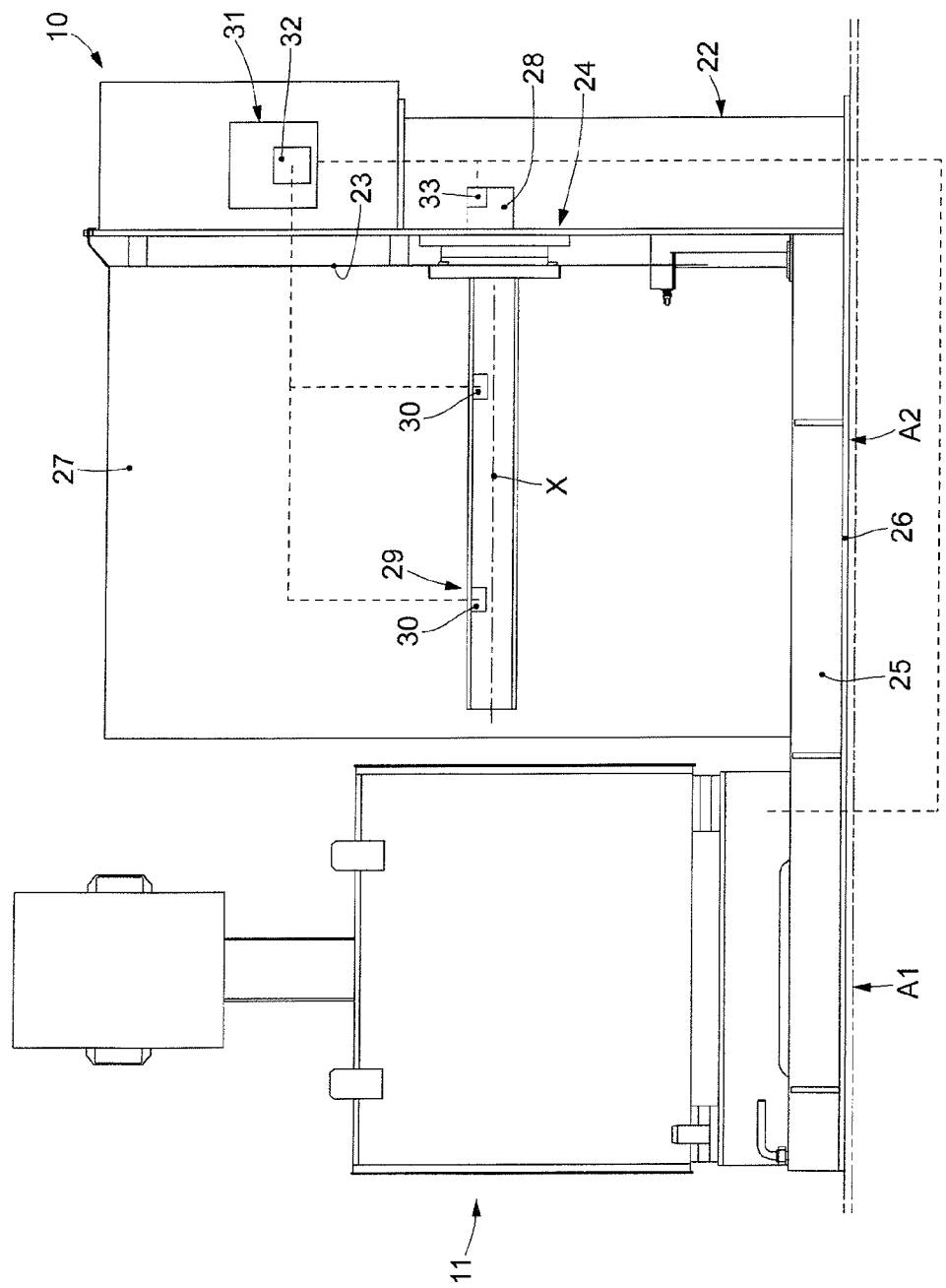
FIG. 2 is a lateral view of the apparatus of FIG. 1 in an inoperative condition.

In the first operating zone A1 the support slider 24 is in a position of non-interference with respect to the resistance 21 (FIG. 2), while in the second operating zone A2 the support slider 24 is located substantially below the resistance 21, and the inductor 11 is positioned around the same resistance 21 (FIG. 3).

According to further embodiments, the support structure 22 can comprise protection walls 27, which extend parallel to each other on opposite sides of the vertical wall 23.

The protection walls 27 are configured to enclose at least the operating zone A2 in which, during use, the inductor 11 is positioned. The protection walls 27 can have an extension correlated to the length of the resistance 21, for example slightly greater than it.

According to some embodiments, the control and command unit 31 is configured to automatically perform the drying treatment of the inductor 11 according to a desired and defined program.

In particular, the control and command unit 31 is configured to modulate the power supply of the resistance 21 on the basis of a closed loop feedback control of the temperature of the resistance 21 and/or of the layer of refractory material 13 of the inductor 11.

According to some embodiments, the temperature of the refractory material 13 is estimated as a function of the temperature of the resistance 21 detected by the temperature detection sensors 28.

According to some embodiments, it can be provided that the control and command unit 31 regulates the drying cycle on the basis of a mathematical model of the inductor 11, and in particular of a thermal model of the refractory material 13 of the inductor 11.

The mathematical thermal model can be stored in a storage unit 32 connected to, or integrated in, the control and command unit 31. A plurality of thermal models can also be provided in the storage unit 32, each associated with a determinate type of inductor 11, for example correlated to the characteristics of the binding material, or of the refractory material 13, to the thickness thereof, and/or to the sizes of the transit channel 14.

According to some embodiments, the thermal model can be used to estimate the temperature of the refractory material 13 from the deepest layer in contact with the coil 12, to the outermost layer defining the transit channel 14 as a function of a detected temperature of the resistance 21, detected by the detection devices 29.

Providing a mathematical modeling of the inductor 11 simplifies the control of the drying cycle, since it is not necessary to position detection probes inside the transit channel 14 of the inductor 11.

Furthermore, the control and command unit 31, knowing the temperature trend of the innermost and deepest layers of the refractory material 13 on the basis of the thermal model, can command the functioning of the apparatus 10 so that these layers also reach the desired temperature, in order to obtain a uniform and homogeneous drying of the chemical binders contained in the composition of the refractory material 13.

According to some embodiments, the control and command unit 31 is configured to regulate the electric voltage applied to the resistance 21 as a function of the programmed drying cycle and the detected and estimated temperatures respectively of the resistance 21 and of the refractory material 13.

According to some embodiments, the electric voltage applied to the resistance 21 is modulated by acting on the power supply device 28.

According to some embodiments, there can be provided switch devices 33, for example static relays, associated with the power supply device 28, on which the control and command unit 31 can act in order to partialize the electric voltage supplied to the resistance 21.

According to some embodiments, the control and command unit 31 can be connected to the cooling circuits 16 of the inductor 11 so as to regulate their functioning, on the basis of the progress of the drying cycle and the increase in the temperature of the inductor 11, so as to protect the coil 12 from possible damage caused by too much heat.

For example, the control and command unit 31 can be configured to act on shut-off valves 34 of the cooling circuits 16, in order to allow the circulation of the cooling fluid in the coil 12 as a function of a state of progress of the treatment cycle, or when a temperature of the refractory material 13 is estimated higher than a predefined threshold value.

The device 10 according to the invention can also be used to maintain the inductor 11 at temperature once the drying treatment has been carried out. In this case, the control and command unit 31 can be configured to activate the resistance 21 in such a way as to maintain the temperature of the refractory material 13 at around 60-90° C., advantageously 70-90° C.

According to some embodiments, the apparatus 10 can comprise a temperature maintenance device, not shown, made as a separate unit, possibly separated from the support structure 12, configured to maintain at temperature an inductor 11 placed in storage.

According to some embodiments, the temperature maintenance device is regulated automatically.

According to one formulation, the temperature maintenance device is configured to maintain the entire inductor 11 at temperature.

According to a variant, the temperature maintenance device is configured only to cooperate with the transit channel 14 and a given periphery at the side of the two through holes 18.

According to another variant, the temperature maintenance device only affects the transit channel 14.

According to some embodiments, the temperature maintenance device comprises a resistance able to be positioned inside the transit channel 14 of an inductor 11 placed in storage, connected to, and suitably activated by, the control and command unit 31.

Embodiments described here also concern a method for carrying out a drying treatment, or dry out, of an inductor 11, in order to eliminate the residual humidity of the refractory material 13 disposed inside it before its installation.

According to some embodiments, the method provides to position an inductor 11 on a heating device 20 outside a rolling line and to command the functioning of the heating device 20 by means of a control and command unit according to a desired heating program.

In particular, the method provides to position the inductor 11 with its transit channel 14 coaxial to a resistance 21 located cantilevered with respect to a wall 23 of a support structure 22, and to regulate the electric voltage supplied to the resistance 21 as a function of the predefined program.

According to some embodiments, the method provides to regulate the electric voltage supplied to the resistance 21 by performing a feedback control of the temperature of the refractory material 13 of the inductor 11.

According to some embodiments, the method provides to detect the temperature of the resistance 21 and, on the basis of a mathematical thermal model, estimate the temperature of the refractory material 13, and use this estimated value to regulate the electric voltage supplied to the resistance 21.

According to some embodiments, the control and command unit 31 can command the switch devices 29 in order to activate/deactivate the power supply devices 28 and thus suitably modulate the supply voltage of the resistance 21.

According to some embodiments, the control and command unit 31 can command the functioning of the resistance 21 so that the average temperature of the refractory material 13 in the inductor 11 follows a trend similar to that shown in FIG. 4.

For example, the temperature of the inductor 11 can be increased in the first interval Δt1 with a first temperature gradient, kept substantially constant in the second interval Δt2, increased again in the third interval Δt3 with a second temperature gradient, once again kept constant in the fourth interval Δt4 and once again increased in the fifth interval Δt5 with a third temperature gradient.

According to some embodiments, the second temperature gradient is smaller than the first temperature gradient, but it is maintained for a longer amount of time. For example, the duration of the third interval Δt3 can be equal to approximately 3-4 times the duration of the first interval Δt1.

According to some embodiments, the method provides to carry out a first heating step for an interval Δt1 of about 3-4 hours, increasing the temperature according to a first gradient of about 40° C./h.

Subsequently, the method provides to carry out a first stabilization step maintaining the temperature constant within a range of about 130-160° C. for an interval Δt2 of about 4-5 hours.

The method also provides to carry out a second heating step, downstream of the first stabilization step, increasing the temperature with a second gradient of about 25° C./h for an interval Δt3 of about 14-16 hours, so that the refractory material 13 reaches a temperature comprised between 400° C. and 450° C.

The method according to the invention also provides to carry out a second stabilization step, maintaining the temperature constant in a range of about 400-450° C. for an interval Δt2 of about 4-5 hours.

According to some embodiments, the method can also provide another heating step, in which the temperature is increased according to a third gradient equal to about 50° C./h, until the estimated temperature of the refractory material 13 reaches a value of about 600° C.

It is understood that the drying treatment cycle can provide a different number of heating and/or stabilizing steps. Furthermore, the number and the duration of the intervals, and the temperature values and gradients can be modified according to requirements, for example as a function of the type and/or sizes of the inductor 11, the type of refractory material 13 or the thickness of the layer, or based on other parameters, for example the relative atmospheric humidity.

According to some embodiments, the method provides to activate the cooling circuits 16 of the coil 12 of the inductor 11 when a temperature of the refractory material 13 is estimated higher than a defined threshold value.

In the initial step of the drying treatment cycle, that is, in the first 7-8 hours, the maximum temperatures of the innermost layers of the refractory material 13 generally do not exceed 70-80° C., sufficient to allow the residual water to dry, but at the same time such as not to thermally stress the isolator in the coil 12.

For example, according to some embodiments, the method can provide to circulate a cooling fluid in the cooling circuits 16 when the temperature of the internal layers of the refractory material 13 in contact with the coil 12, estimated by the control and command unit 31, exceeds 80-100° C.

According to other embodiments, the method can provide to make the cooling fluid circulate in the coil 12 as a function of the state of progress of the drying cycle, for example from the third interval Δt3 indicated in FIG. 4, when the temperatures rise from about 160° C. to about 430° C.

At the end of the drying treatment cycle, the inductor 11 is ready for use and can be installed in the rolling line, which will therefore be interrupted only for the amount of time necessary to remove the previous inductor 11 and insert and connect the new one.

According to other embodiments, the inductor 11 can be placed in storage.

According to these embodiments, the method provides to maintain the inductor 11 at temperature so as to maintain the temperature of the refractory material 13 in a range of about 60°-90°, advantageously 70-80° C., sufficient to inhibit the hygroscopicity of the material.

According to some embodiments, the inductor 11 can be maintained at temperature by means of the same.

It is clear that modifications and/or additions of parts and/or steps may be made to the apparatus 10 and method for the drying treatment of an inductor 11 as described heretofore, without departing from the field and scope of the present invention.

For example, it can be provided that at least one of either the resistance 21 or the support slider 24 are mobile in a vertical direction so as to allow the use of the apparatus 10 for inductors 11 of different sizes.

In this way, it is possible on each occasion to position the resistance 21 coaxial to the transit channel 14, so as to guarantee a uniform and homogeneous heating of the refractory material 13.

It is also clear that, although the present invention has been described with reference to some specific examples, a person of skill in the art shall certainly be able to achieve many other equivalent forms of apparatus 10 and method for the drying treatment of an inductor 11, having the characteristics as set forth in the claims and hence all coming within the field of protection defined thereby.

The invention claimed is:

1. An apparatus for the off-line drying treatment, or dry out, of an inductor for billets, comprising: a coil and a protection body made of refractory material and defining a transit channel for the billets, wherein said apparatus comprises a heating device comprising at least one electric resistance configured to transform the electrical energy received into radiant heat and to act as a false billet, wherein said electric resistance has size and characteristics correlated to the sizes and characteristics of a real billet the inductor be made to pass in the transit channel of the inductor, with an oblong development along a longitudinal axis and located, during use, inside the transit channel of the inductor, a support structure configured to support said resistance cantilevered in such a way that its axis of longitudinal development is oriented substantially horizontally, power supply devices configured to supply electrical energy to said resistance, and a control and command unit configured to command said power supply devices and regulate the functioning of said resistance according to a predefined program.

2. The apparatus as in claim 1, comprising temperature detection sensors configured to detect the temperature of said resistance, wherein said temperature detection sensors comprise at least one thermocouple associated with said at least one resistance.

3. The apparatus as in claim 2, wherein said control and command unit is configured to modulate the supply voltage of said resistance on the basis of a feedback control in a closed loop of a detected temperature of said resistance and/or of a temperature of said refractory material estimated on the basis of a thermal mathematical model of the inductor to be subjected to drying treatment.

4. The apparatus as in claim 1, comprising a support slider configured to support configured to and to move it with respect to said resistance.

5. The apparatus as in claim 4, comprising a support base connected to said support structure, on which guide members are provided, suitable to cooperate with said support slider.

6. A method for the off-line drying treatment, or dry out, of an inductor for billets comprising a coil and a protection body made of refractory material defining a transit channel for the billets and arranged to perform said drying treatment outside the rolling line, wherein said method comprises:
   positioning said inductor with said transit channel around a heating device comprising at least one electric resistance configured to transform the electrical energy received into radiant heat and to act as a false billet having sizes and characteristics correlated to the sizes and characteristics of a real billet intended to be made to pass in the transit channel, with an oblong development along a longitudinal axis, and wherein said inductor with its transit channel is positioned coaxial to said resistance which is located cantilevered with respect to a wall of a support structure in such a way that its axis of longitudinal development is oriented substantially horizontally;
   supplying electrical energy to said resistance by means of power supply devices;
   commanding said power supply devices and regulating the electric voltage supply to said resistance according to a predefined program by means of a control and command unit in order to suitably heat said resistance and performing a desired cycle of drying treatment on said inductor comprising successive steps of heating and stabilizing the temperature of said refractory material.

7. The method as in claim 6, including detecting the temperature of said electric resistance by means of detection devices associated with it, and to modulate the power supply of said resistance based on a feedback control in a closed loop of a detected temperature of said resistance and/or a temperature of said refractory material estimated on the basis of a thermal mathematical model of the inductor to be treated.

8. The method as in claim 6 including circulating a cooling fluid in the coil of the inductor when the temperature of the resistance and/or of the refractory material exceeds a defined threshold value.

9. The method as in claim 6, including, at the end of the drying treatment cycle keeping said inductor at temperature in such a way that the temperature of the refractory material remains around 60-90° C.

* * * * *